Aug. 14, 1956  F. W. CLINE  2,758,889
UNIT FOR ADJUSTING TRACKS OF CRAWLER TYPE TRACTORS
Filed Nov. 28, 1952  2 Sheets-Sheet 1

Frank W. Cline
INVENTOR

BY *CA Snow &Co.*
ATTORNEYS.

Aug. 14, 1956     F. W. CLINE     2,758,889
UNIT FOR ADJUSTING TRACKS OF CRAWLER TYPE TRACTORS
Filed Nov. 28, 1952     2 Sheets-Sheet 2

Frank W. Cline
INVENTOR

BY *Cashrowles.*
ATTORNEYS.

United States Patent Office 2,758,889
Patented Aug. 14, 1956

2,758,889

UNIT FOR ADJUSTING TRACKS OF CRAWLER TYPE TRACTORS

Frank W. Cline, Arcadia, Fla.

Application November 28, 1952, Serial No. 323,113

1 Claim. (Cl. 305—9)

This invention relates to tractor construction, and more particularly to an attachment designed for adjusting crawler type tracks of tractors to adjust or remove slack which may occur in tracks caused by use, to insure the effective operation of the tractor.

An important object of the invention is to provide effective and simple means for accomplishing the adjustment of the tracks to remove slack, the adjusting device being used in lieu of the usual idler adjusting lock bolt, which is common tractor construction, but which is inconveniently located adjacent to the tractor idler pulley.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings.

Figure 1:
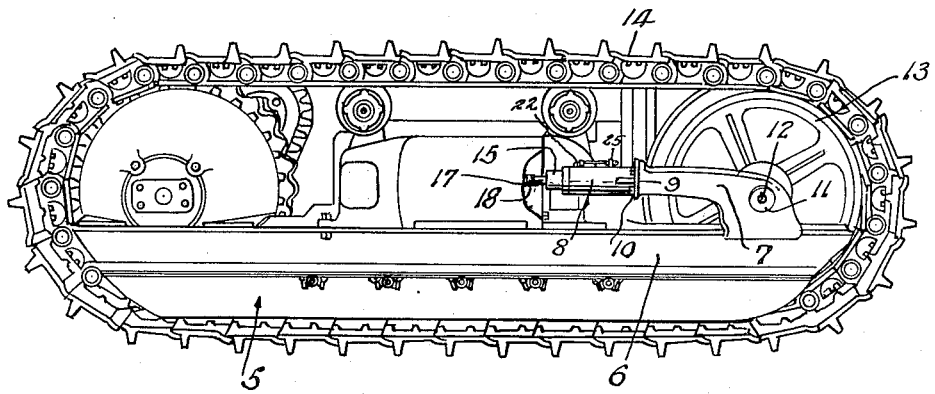
Figure 1 is a side elevational view of a tractor of the crawler or endless track type, illustrating the usual idler guide bracket, to which the adjusting unit is attached.
Figure 2:
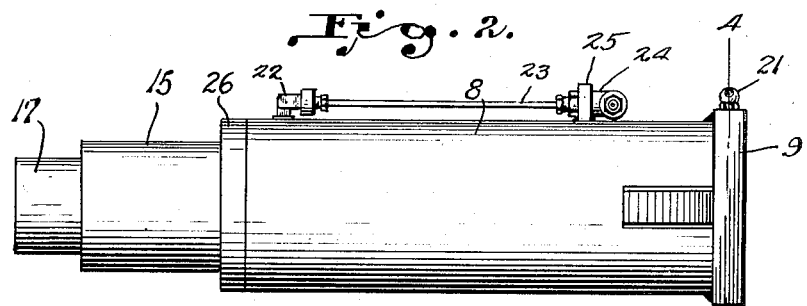
Fig. 2 is an enlarged elevational view of the adjusting unit.
Figure 3:
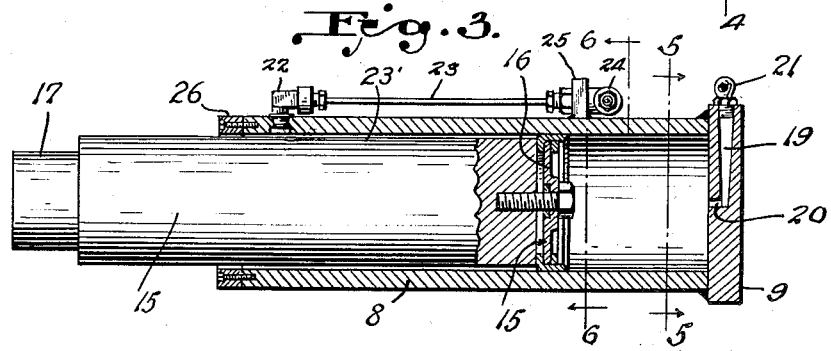
Fig. 3 is a longitudinal sectional view through the unit, a portion of the piston of the unit being shown in section.
Figure 4:
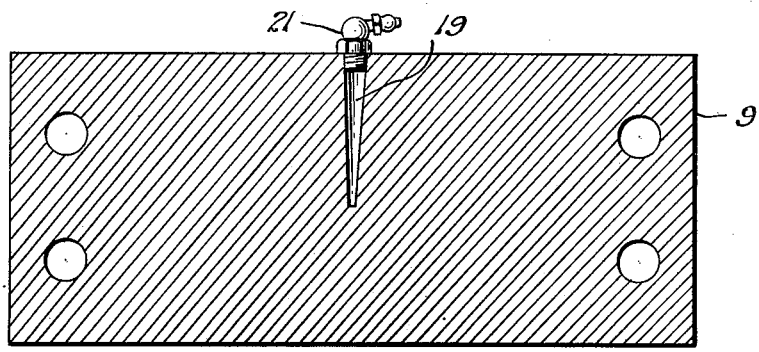
Fig. 4 is a sectional view taken on line 4—4 of Fig. 2.
Figure 5:
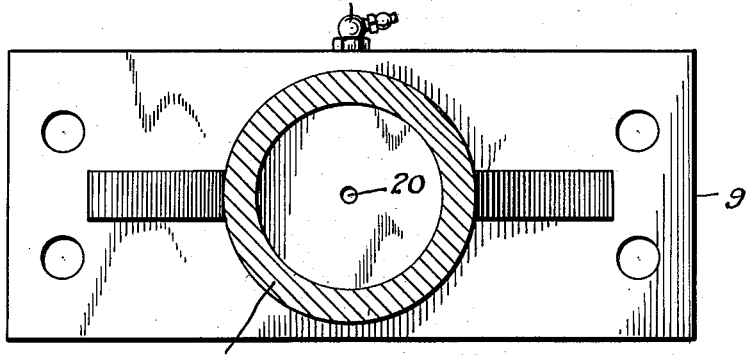
Fig. 5 is a sectional view taken on line 5—5 of Fig. 3.
Figure 6:
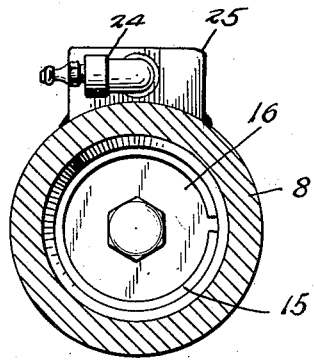
Fig. 6 is a sectional view taken on line 6—6 of Fig. 3.

Referring to the drawings in detail, the tractor frame is indicated generally by the reference character 5 and embodies side rails 6, which side rails provide supports for the idler guide brackets 7 which extend rearwardly as shown by Fig. 1 of the drawings.

It is to be understood that a tractor embodies two of such track sections, one on each side of the tractor frame, but since these track sections are identical, only one of the track sections will be described in detail.

The adjusting unit forming the subject matter of the present invention, comprises the cylinder 8 which has the base 9 that is bolted to the usual idler guide cross plate 10, secured to the forward end of the idler guide bracket 7, as clearly shown by Fig. 1 of the drawings.

The idler guide bracket 7 is formed with the bearing 11 in which the shaft 12 operates, the shaft 12 providing a support for the idler 13, over which the endless track 14 operates.

Operating within the cylinder 8 is the plunger 15, which is provided with the usual cup washer 16 that moves along the wall of the cylinder providing a fluid tight connection between the plunger 15 and cylinder wall. The cylinder 8 is provided with a sealing ring 26 which snugly engages about plunger 15 and seals the latter relative to cylinder 8.

The outer end of the plunger 15 is reduced as at 17, the reduced end 17 bearing against the stationary element 18, which in the present showing is the usual adjusting bolt of the idler guide bracket of the tractor, the bolt having been cut off to the desired length to provide such bearing.

The base 9 is provided with the tapered bore 19 that communicates with the opening 20 that in turn communicates with the cylinder 8 so that the material, preferably chassis grease, may be directed into the cylinder under pressure, forcing the plunger 15 outwardly against the member 18, with the result that the idler guide bracket connected therewith, is moved forwardly, and since the endless track moves over the idler supported on said bracket, it will be obvious that the slack will be removed from the endless track, tightening the same on its supporting wheels.

The conventional grease fitting indicated at 21, is positioned in the outer end of the tapered bore 19 and is constructed to receive the discharge end or coupling of the usual grease gun, for applying the grease.

Due to the construction and tapered wall of the bore 19, pressure on the grease fitting will be reduced to insure against the pressure blowing out said fitting, during the application of grease.

The reference character 22 indicates a coupling which is threaded in an opening formed in the wall of the cylinder 8, the coupling 22 communicating with the groove 23' formed in the inner surface of the cylinder. Connected with the coupling 22 is the pipe 23 which also extends into one end of the grease coupling 24 which is securely held within the bracket 25 welded to the outer surface of the cylinder. The coupling 24 is designed to receive the usual grease gun so that grease may be forced into the cylinder to seal the cylinder against moisture entering the cylinder by seepage around the pistons.

From the foregoing it will be seen that due to the construction shown and described, it is possible to adjust the idler guide brackets of an endless track tractor, by merely applying grease to the cylinders of the unit, forcing the plungers thereof outwardly, causing the adjustment of the idler guide bracket in one direction. When it is desired to remove the endless track, it is only necessary to remove the fitting 21 and move the tractor forwardly and rearwardly, whereupon the plunger 15 will be moved within the cylinder, forcing a quantity of grease from the cylinder and allowing the endless track to become slack and easily removed.

Having thus described the invention, what is claimed is:

An adjusting member of the type described, comprising a cylinder, a base having a tapered bore formed therein, closing one end of said cylinder, said base having an opening formed at the inner end of the tapered bore through which grease from said bore enters said cylinder, a grease fitting secured in the outer end of said base, the base of said cylinder adapted to be secured to a movable element, an elongated solid piston of a diameter slightly less than the interior diameter of said cylinder, operating in said cylinder, a cup shaped sealing member fixed to the inner end of said piston, one end of said piston adapted to bear against a stationary object, moving said cylinder and movable element to which it is secured, longitudinally when grease is forced into the cylinder at one end thereof, a sealing ring fixed to the outer end of said cylinder and snugly engaging about said piston and a second grease fitting communicating with the interior of the cylinder for supplying grease to the surface of the cylinder throughout the length thereof, and the grease in said cylinder adapted to hold said piston against movement within the cylinder.

(References on following page)

References Cited in the file of this patent

UNITED STATES PATENTS

| | | |
|---|---|---|
| 1,871,820 | Morton | Aug. 16, 1932 |
| 2,362,241 | Campbell | Nov. 7, 1944 |
| 2,383,754 | Watt | Aug. 28, 1945 |
| 2,448,983 | Johnson | Sept. 7, 1948 |
| 2,452,671 | Merrill | Nov. 2, 1948 |
| 2,502,290 | Szitar | Mar. 28, 1950 |
| 2,533,531 | Stephens | Dec. 12, 1950 |
| 2,697,641 | Henderson | Dec. 21, 1954 |